June 27, 1950  C. J. SCHWARTZ  2,512,812
SLEIGH BRAKE
Filed May 6, 1947
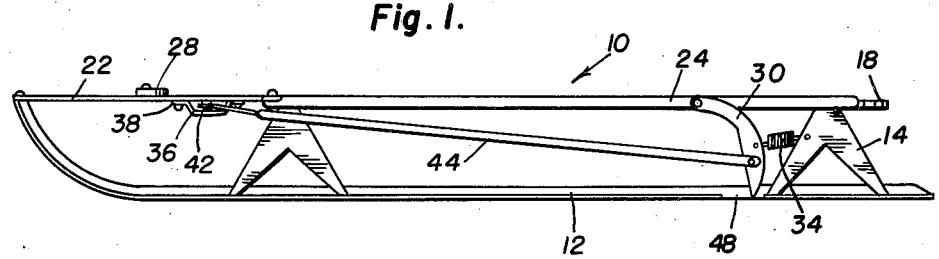
Fig. 1.
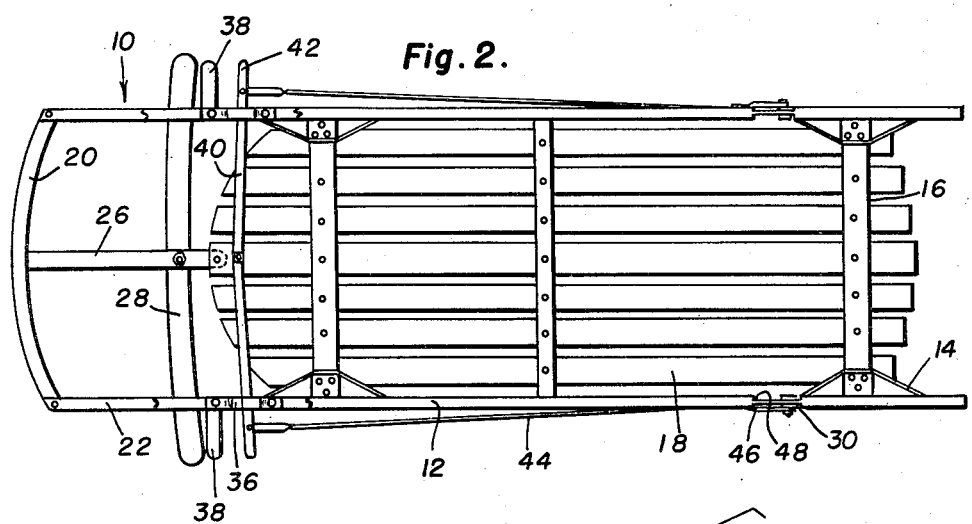
Fig. 2.
Fig. 3.
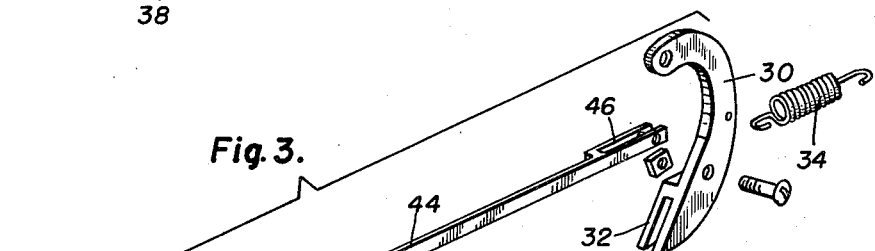
*Inventor*
Charles J. Schwartz
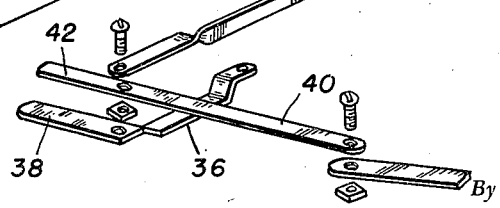
By Clarence A. O'Brien
and Harvey B. Jacobson
*Attorneys*

Patented June 27, 1950

2,512,812

UNITED STATES PATENT OFFICE 2,512,812

SLEIGH BRAKE

Charles J. Schwartz, Bethlehem, Pa., assignor of fifty per cent to Vilma Schwartz, Bethlehem, Pa.

Application May 6, 1947, Serial No. 746,193

2 Claims. (Cl. 188—8)

This invention relates to new and useful improvements in sleigh brakes and the primary object of the present invention is to provide a novel and improved hand operated brake mechanism that projects beneath the lower side of the runner for engagement with an ice or snow bed to prevent forward motion of the sled.

Another important object of the present invention is to provide a dual brake shoe which is individually operated for steering of the sled as well as for retarding the movement thereof.

A further object of the present invention is to provide a sleigh brake which is quickly and readily applied to any conventional type of sled for convenient and instant use by the occupant thereof.

A still further aim of the present invention is to provide a brake for sleds that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a sled, the present invention applied thereto:

Figure 2 is a bottom plan view of Figure 1; and,

Figure 3 is a group perspective view of the elements producing the present brake mechanism.

Referring now to the drawings in detail, wherein for the purpose of illustration, there is disclosed a preferred embodiment of the present invention, the numeral 10 represents generally a sled comprising side runners 12, turned upwardly at their forward ends. A plurality of longitudinally spaced braces 14 are secured at their lower ends to each of the runners and project upwardly therefrom with cross bars 16 connecting the upper ends of transversely aligned braces.

Suitably secured to these cross bars 16 are parallel spaced boards 18 forming the body of the sled.

Extending transversely between the forward ends of the runners is a forward head protecting bar 20, the terminal portions of which are pivotally secured to the respective runners. The sled is also provided with side members 22 connecting the bar 20 to the side rails 24 of the body portion and a handle supporting member 26 which extends parallel between side members 22 and is removably secured to the body portion.

A handle bar 28 is pivoted to member 26 and its terminal portion projects outwardly from the sides of the sled whereby they may be conveniently gripped for guiding the sled in its forward movement.

The present invention is not designed to claim the foregoing sled construction but it is merely intended as an additional feature thereto, although the present invention may also be employed on sled structures which vary from the previously described structure.

Pivoted to the side rails 24 of the sled adjacent the rear portions thereof, are arcuate brake plates 30 having their lower terminal portions of increased thickness, which may be effected by the addition of an arcuate tip 32 spaced slightly from said plate.

Coil springs 34 respectively engage these plates and the bracket 14 at the rear of the sled for normally retaining the free terminal portions of the brake plate raised above the side runners 12.

Removably secured beneath the side members 22 are substantially U-shaped brackets 36 provided with right angular extensions 38 projecting outwardly from said side members, to provide fixed hand grips.

Pivotally and removably mounted at substantially the center of the body at its forward end, are the inner ends of a pair of outwardly projecting transverse bars 40, the terminal portions of which provide movable hand grips 42. Pivotally mounted to these hand grips are the forward ends of a pair of brake plates actuating members 44 having their rear ends 46 bifurcated to pivotally engage the brake plate intermediate their lower extremities.

In operation of the brake mechanism, the movable hand grips 42 are gripped by both hands of the sled operator, and using grips 38 as levers, the grips 42 may be conveniently extended forwardly to cause the terminal ends of the brake plates to extend downwardly through apertures 48 provided in side rail 12 and hence dig into the snow or ice bed over which the sled passes. By increasing or decreasing the pressure on either of the grips 42, the direction of the sled may be changed.

Obviously, the grips 42 may also be extended forwardly by the feet of the sled operator and in such an operation, the feet of the sled operator will contact the fixed grip 38 limiting forward movement of the brake plate and preventing unnecessary wear on the plates.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. In a sled, a top structure, a runner structure, brace means between the top structure and the runner structure, arcuate brake plates having upper ends pivoted on the top structure for vertical swinging movement below the runner structure, resilient means between the plates and brace means for normally retaining said plates raised above the runner structure, fixed hand gripping means carried by the side rails at each side thereof, a sectional cross member pivoted on the top structure for horizontal swinging movement and having outer end portions projecting outwardly from the side members to form movable hand gripping means, and actuation members between the outer end portions of said cross members and said plates for moving the lower end of said plates forwardly below the runner structure, said cross member being disposed rearwardly of said fixed hand gripping means, the outer end portions of said cross member being manually forced toward the fixed hand gripping means for movement of the brake plates to their brake-applying position.

2. In a sled structure including a top structure, a pair of runners and brace means between the top structure and the runners; a combined guiding and braking attachment for the sled structure, said attachment comprising a pair of arcuate guiding and braking plates having upper and lower ends, pivot pins securing the upper ends of said plates to the sides of the top structure for vertical swinging movement of the plates parallel to the longitudinal axis of the sled structure, the lower ends of said plates being bifurcated to receive the runners, said brace means including a rear brace member, springs securing the central portions of said plates to the rear brace member and urging the plates to a rearwardly raised position, hand grips fixed to and projecting laterally from the top structure adjacent the forward end thereof, a pair of operating arms having inner and outer end portions, a common pin pivotally securing the inner end portions of said arms to the under surface of said top structure for horizontal swinging movement of said arms, said arms being spaced above and rearwardly from said hand grips, means carried by and projecting rearwardly of said hand grips for slidably supporting said arms and for also limiting rearward swinging movement of said arms, and a pair of elongated connecting straps terminally pivoted to the outer end portions of said arms and to the plates adjacent the lower ends of the plates, the outer end portions of said arms being manually forced toward the hand grips for forward swinging movement of said plates to their brake-applying position, said arms being operated independently for guiding the movement of the sled structure.

CHARLES J. SCHWARTZ.

REFERENCES CITED

The following references are of record in the file of this patent:

UNITED STATES PATENTS

| Number | Name | Date |
|---|---|---|
| 575,956 | Jensen | Jan. 26, 1897 |
| 1,614,137 | Limbers | Jan. 11, 1927 |
| 2,008,488 | Browne et al. | July 16, 1935 |
| 2,107,893 | Heffner et al. | Feb. 8, 1938 |